BEST AVAILABLE COPY

July 25, 1972 NOBUZO KUBO ET AL 3,679,500

METHOD FOR FORMING PERFORATIONS IN METAL SHEETS BY ETCHING

Filed Aug. 7, 1970 2 Sheets-Sheet 1

INVENTORS.
NOBUZO KUBO
TAKSHI ITO

BY John Cyril Malloy
ATTORNEY.

BEST AVAILABLE COPY

July 25, 1972 NOBUZO KUBO ET AL 3,679,500

METHOD FOR FORMING PERFORATIONS IN METAL SHEETS BY ETCHING

Filed Aug. 7, 1970 2 Sheets-Sheet 2

INVENTORS.
NOBUZO KUBO
TAKSHI ITO

BY John Cyril Malloy
ATTORNEY.

United States Patent Office 3,679,500
Patented July 25, 1972

3,679,500
METHOD FOR FORMING PERFORATIONS IN METAL SHEETS BY ETCHING

Nobuzo Kubo and Takeshi Ito, Hikone, Japan, assignors to Dainippon Screen Manufacturing Company, Limited, Kyoto, Japan Filed Aug. 7, 1970, Ser. No. 62,009
Int. Cl. H01l 7/50
U.S. Cl. 156—11 2 Claims

ABSTRACT OF THE DISCLOSURE

A method and apparatus for perforating thin sheet or web material as in the manufacture of various thin metal screen products. The method of the invention generally comprises the following steps: Providing on opposite side surfaces of a metal sheet or web a coating of etch-resistant pattern film material having apertures of desired configuration; effecting a first slight etching from one side or both sides of the sheet or web stock; forming slight depressions in the web surfaces in the areas uncovered by the apertures of the etch-resistant coatings; providing a second etch-resistant coating over the entire face of one of the slightly etched faces of the web material; effecting a second etching action on that side of the web opposite from the second coating, such as to form the perforations, and then removing the etch-resistant coatings and pattern film material from the perforated web or sheet material.

BACKGROUND OF THE INVENTION

Field of the invention

The invention relates to apparatus and method for forming perforations or articles of desired configuration of metal sheet or web material by photo-etching or chemical etching processes.

Description of the prior art

The techniques for producing various metal parts or articles by the so-called photo-etching process utilizing photoengraving techniques have come to be employed widely in a variety of fields in industry. Among the commercial articles manufactured by using such techniques are shadow mask for color television tubes, various types of metal screens, lens shutter vanes, vacuum evaporation masks for manufacture of electronic parts, and so forth.

In the manufacture of these articles according to the etching techniques, in case the metal blank sheet is of a comparately small thickness, an etching-resistant pattern film having a desired configuration is photographically printed and developed on one side only of the sheet or web stock, and the chemical etching is effected from only that side, thereby forming perforations conforming to the pattern of the pattern film material on the web stock. In other manufacturing processes, the etch-resistant pattern films are disposed in registry and on opposite side surfaces of the metal sheet or web stock, and the etching action is applied on both sides of the web simultaneously to accomplish the desired perforations.

The latter method of simultaneously etching both sides of the sheet material has the advantage in that more exact perforations can be obtained; however, this method, as practiced in present art, is still found lacking where very exact dimensional etching is required and etching of high precision performed. There is a problem of particular import in obtaining repetitiously uniform etching and this is so particularly in work requiring high dimensional accuracy. While it is desirable for the etching action to advance only depthwise of a sheet or web surface, actually a certain degree of etching takes place breathwise of the surface. This may be caused by variation in the composition of the etching liquid, its temperature or the composition of the metal web or sheet stock material to be etched; such factors result in a varying rate at which the etching action advances in the web material thereby causing inaccuracy in the shape of the perforations and irregular or inconsistent sizes of one perforation relative to another perforation. In such cases where the etching is conducted from both sides simultaneously, the effect of variation of the etch-advancing rate is doubled, resulting in inaccuracy and inconsistent dimensional precision of the perforations, and if the etching action is effected from one side only of the web stock, the etching action occurs throughout the full thickness of the web and even worse precision control of the perforations results in the etched product.

In the forming of shadow masks for color television tubes, it is desirable that the perforations therefor be etch-formed having a larger diameter on one side surface of the web and to provide substantially an undercut effect or taper in the peripheral edges of each perforation. In the manufacture of certain electronic products, particularly in the manufacture of shadow masks for television tubes, the undercutting effect of each aperture is desirable for avoiding interference of electron beams passing through such perforations in reaching the fluorescent layer of a tube and for preventing the electrons from impinging on the side edges of each perforations, obstructing the electron beams and causing diffused reflection. The undercutting or tapered effect also is desirable in the production of the aperture grills for trinitron type picture tubes and related products.

In order to obtain perforations provided with undercutting or taper, the prior art practice is either to vary the aperture or mesh size of the printed patterns on one side of the web relative to the other side, or to change the amount or spray pressure of the etching liquid fed against one side of the web relative to the other side, or to employ a method using both of these measures. Although the prior art practices have provided reasonable accuracy in etch forming certain articles requiring nominal precision, in certain other articles particularly in the electronic product field, the present practices in many manufacturing processes do not provide a degree of precision or accuracy as is often desired. This is particularly so in the production of trinitron aperture grills that are formed from thin fragile sheet material and are provided with a multiplicity of thin parallel slits of fragile or delicate character. Heretofore, in the forming of the thin metal slit portions, there was a tendency during manufacture for the thin fragile strips of metal to twist or fracture as the spray liquid forces were applied during manufacture and which may result in waste products or in formation of products of less desired quality.

The instant invention obviates many of the abovementioned objectionable features in the prior art and has an important object to provide an improved method and apparatus for forming perforations of high dimensional precision by chemical etching and without causing damage to the thin delicate web stock material during processing; the invention is particularly useful in preventing damage resulting from forces applied during the etching process and in forming such articles as trinitron aperture grills.

ADDITIONAL PRIOR ART DESCRIPTION

Figures 1, 1A, 2, 2A:
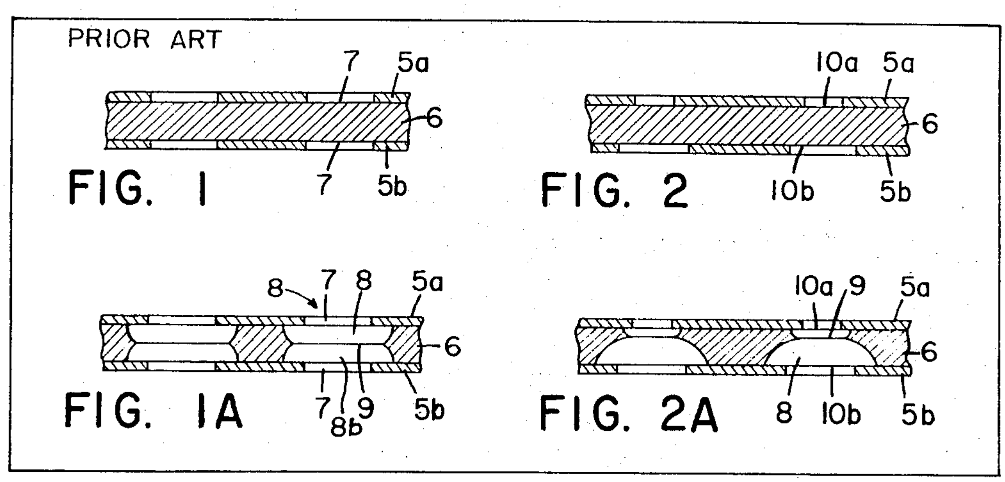
PRIOR ART FIG. 1, FIG. 2, FIG. 1A, FIG. 2A
FIGS. 1 and 1A and FIGS. 2 and 2A illustrate prior art and two conventional methods used in etch-forming products.

In a conventional, simultaneous, both-side etching method, as shown in FIGS. 1 and 1A, firstly, the apertured etch-resistant pattern films 5*a* and 5*b* are provided in register on the opposite face surfaces of a metal sheet or web 6. This is usually accomplished by applying on both face surfaces of the sheet stock material, a photo-sensitive resin which is hardened upon exposure to light, such as the product sold by the commercial name of KPR or TPR, or a photo-sensitive liquid which is hardened upon exposure to light, such as the products sold under the commercial name KPR or TPR, or a photo-sensitive liquid which is hardened upon exposure to light, such as bi-chromate-containing glue or PVA, or a so-called positive type photo-sensitive liquid which is soluble upon exposure to light; then, secondly, superimposing a negative plate having a desired pattern over the pattern film material, exposing the material to high intensity light, and then effecting required development, film-hardening and burning. In FIG. 1, the numeral 7 indicates the exposed metal surface portions of the web in the apertures of the pattern film and the area of the web surface where the etching action is to be effected.

After preparing the web or sheet stock 6 by coating it with the desired pattern-film, it is then wetted with an etching liquid from both sides simultaneously to cause gradual melting or erosion of the exposed areas 7 by the biting corrosive action of the etching liquid, forming recesses or depressions 8*a* and 8*b* on opposite side surfaces of the thin stock 6; the erosive action of the etching liquid acting on opposite sides of the web material erode together, meeting along the medial plane 9 and forming through openings or perforations 8 (see FIG. 1A). Upon reaching this stage, the etching action is fixed or stopped and the etch-resistant pattern films *5a* and *5b* are stripped off with a suitable cleaning agent.

Since the etching or corrosive action progresses not only in a direction depthwise to the web surface, but also in a direction breathwise of the surface, the bounding edge margin of each perforation 8 is tapered inwardly, that is depthwise of a perforation and with the larger diameter being near the sheet surface and a smaller diameter near the medial plane 9 of the web material. The composition of the etching liquid may be of any suitable commercial mixture having properties acting to chemically erode the metal; the particular etching liquid utilized may be determined substantially by the composition or character of the metal of the sheet stock material; aqueous ferric chloride solution is popularly used when the blank or web stock material is formed of iron or thin copper sheet stock.

In FIGS. 2 and 2A is shown anoher form of conventional simultaneous-both-face etching process and wherein the perforations of the etch-resistant pattern files 5*a* and 5*b* on opposite sides of the sheet material, are of slightly different size and are aligned or are arranged in register through the thickness of the web stock 6; the sizes of the exposed metal surface areas 10*a* and 10*b*, where the etching action is applied, are of different size, that is, as shown in FIG. 2, the areas 10*a* on the upper face surface of the web are smaller than the areas 10*b* on the lower face surface thereof. In each of the above processes (FIGS. 1 and 1A and FIGS. 2 and 2A) it is difficult to control the rate of corrosive action of the etching liquid and to accurately consistently control the diameter of the perforations along the intermediate plane 9 of the thin web material.

DESCRIPTION OF THE PREFERRED EMBODIMENTS METHOD

Figures 3, 3A, 3B, 3C, 3D:
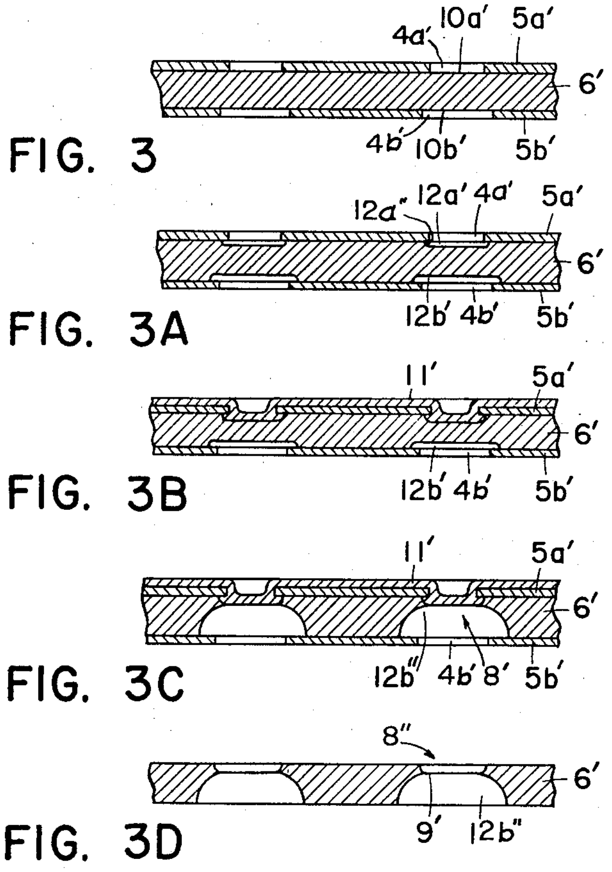
FIGS. 3 through 3D illustrate a series of steps followed in the perforation-etching process according to the present invention.

According to the instant invention, first, a coating or layer of etch-resistant apertured pattern films 5*a'* and 5*b'* is provided on opposite face surfaces of a web or sheet 6' (FIGS. 3). The films define apertures 4*a'* and 4*b'*, and the uncovered etching areas 10*a'* and 10*b'* on opposite side surfaces of the web 6'. The prepared web material is then subpected to a light-degree etching effected preferably simultaneously on both sides of the web, thereby forming shallow recesses 12*a'* and 12*b'* in the etching areas 10*a'* and 10*b'* defined by the respective film aperture openings 4*a'* and 4*b'*. Subsequently, a second etch-resistant coating 11' is applied over the entire face of one of the etched faces of the web, preferably on that web face having the smaller apertures 4*a'* formed in the etch-resistant coating 5*a'*; the shallow recesses 12*a'* formed by the first etching action in the exposed areas 10*a'* of the web material is entirely covered with the coating 11' (FIG. 3B). It is particularly important at this stage of the process that the recesses 12*a'* be perfectly covered with the coating 11' for preventing further eroding or etching of the recess surface 12*a'* during the following or second etching action.

The second etching action is conducted on that side of the web opposite from the second coating 11' (FIG. 3C). The second etching action is continued until the enlarged recesses 12*b''*, intersect and are stopped by the coating 11' and thus forming in effect apertures 8'. Upon the formation of the aperture 8' in the web or sheet 6', the coating 11' and pattern films 5*a'* and 5*b'* are stripped off resulting in a product formed with perforations 8'' of desired configuration and with each perforation having tapered or undercut edge margins, having a smaller diameter 9' disposed offset of the medial plane of the web thickness, which is a desirable feature in certain applications of the invention.

In utilizing the method of the instant invention, the dimensional precision of the smaller diameter portion 9' of each perforation is markedly stabilized. Since the gradient 12*a''* or the bounding margin of each recess 12*a'* is nearly perpendicular to the web surface (FIG. 3A), more uniform aperture shape is provided; since the erosive action, running breathwise of the web stock is retarded by the thickened boundary of each perforation, more accurate control is facilitated in the formation of each perforation. This is in contrast to the prior art practice wherein the medial-plane portion of each aperture is formed by very thin sharp edges and which erode rapidly, causing unstable etching action and inaccurate irregular aperature formation.

Although the FIGS. 3 through 3D, and the above description are directed toward a process of the invention wherein the etching is applied simultaneously on both sides of a web or sheet, it will be understood that in certain embodiments of the invention (not shown) that the light-degree etching action may be conducted on one side only of the work sheet material. In such a process, the etching is performed on the side having the smaller exposed metal surface area (the surface area 10*a'* or the upper surface in FIG. 3). The succeeding stages in such a process ar substantialls the same as in the above-described embodiment of the invention.

APPARATUS

Figure 4:
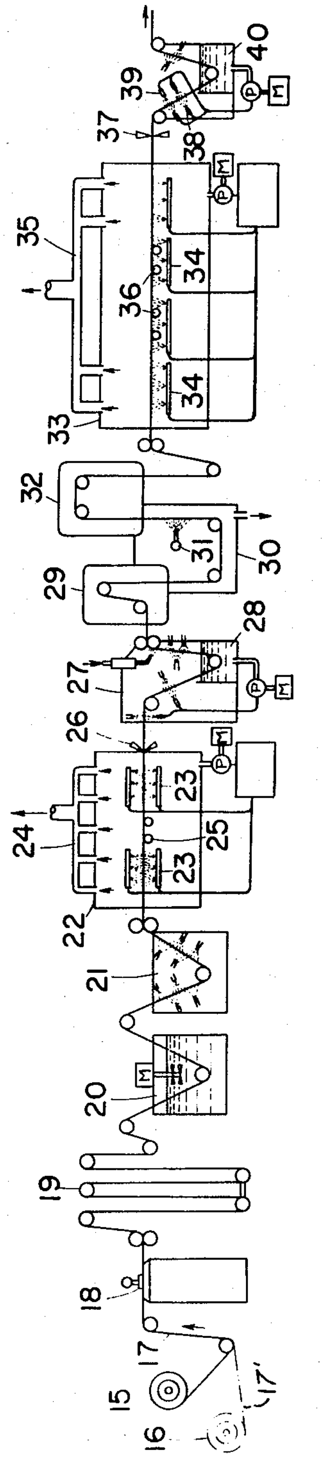
FIG. 4 is a schematic view of an example of the etch-perforating apparatus of the present invention.

Referring to FIG. 4, a web roll 15 or an exchange web roll 16, is formed respectively by metal web stock 17 and 17', with each web being pre-prepared or provided with etch-resistant pattern film coatings of a desired configuration, and formed by any suitable known means. The web stock 17 and 17' is unrolled respectively from the rolls 15, 16 by suitable driving means (not shown); the web passes through a splicing or connecting means 18, a timing mechanism 19, and through a pickling tank 20. The web-connecting means 18 and the timing mechanism 19 are so constructed as to join the trailing end edge of the web of roll 17 to the leading end edge of the roll 16 and vice versa, so as to permit continuous etching operation.

In the tank 20 is contained suitable known pickling or cleaning liquid and this liquid is stirred in conventional manner by motor-actuated impellers or other suitable means for obtaining uniform pickling effect on the web material. Upon completion of the pickling treatment in the tank 20, the web passes into a rinsing tank 21 where it is subjected to water spray from nozzles or by showering for washing and cleaning away the pickling liquid; the web 17 then passes into a first etching chamber 22.

In the first etching chamber 22, a plurality of nozzles 23 is arranged in opposed relation on opposite sides of the web passage, for simultaneously spraying the etching liquid on both sides of the web. The nozzles 23 preferably are arranged for affording swinging or oscillating movement in a plane generally perpendicular to the advancing movement of the web thereby assuring uniform etching action on the oppositely facing web surfaces. The etching solution is supplied to the nozzle 23 from a suitable pressurized liquid supply source; the arrangement preferably is such that the liquid after acting on the web, drops to the bottom of the chamber 22 and is conducted back through the source for recirculation and reuse, arranged at the top of the etching chamber 22 is pipe or hood means 24 adapted for exhausting the vapor or gases of the etching process from the chamber 22 during the etching operation. There is also provided spaced-apart guide rollers 25 for conducting the web 17 along a predetermined course as it passes through the chamber 22.

A light-degree of etching is effected in the etching chamber 22, on both side surfaces of the web 17, according to the pattern film configuration on the opposite sides of the web (see FIG. 3A). When the web leaves the chamber 22, it passes through opposingly arranged air knives 26 provided at the outlet of the chamber, where the excess etching liquid is scrubbed away; the web then is conducted through a washing chamber 27.

In the washing chamber 27, the web is first subjected to a water spray bath to clear away residue etching liquid, the web is then immersed in a rinsing tank 28 and passes through a water shower, thereby perfectly rinsing the web. The cleaned web 17 enters a drying chamber 29 where it is dried under hot air blast and then enters an etch-resistant coating chamber 30.

As the web passes through the chamber 30, it is coated with a layer 11 of etch-resistant material jetted from spray nozzles 31 (see FIG. 3B). The spray nozzles preferably are actuated in oscillatory movement transversely of the web for effecting uniform coating of the web surfaces with the etch-resistant material. The second coating 11' is applied only on one side of the web, and preferably on that web side having the smaller apertures **4*a'* formed in the coating 5*a'*. It is important at this stage of the process, that the shallow recesses 12*a'*** formed in the web surface by the first etching step (FIG. 3A) be perfectly covered with the etch-resistant second coating of material so as to entirely protect that surface from any erosive action of the etching liquid in the ensuing steps of the process.

Leaving the chamber 30, the web passes through a drying chamber 32 which is preferably also of the hot air blast type. The etch-resistant second coating 11' is thoroughly dried and cured in chamber 32, and the web prepared for further processing in a second etching chamber 33.

The etching chamber 33 is provided with a plurality of etching spray nozzle groups 34 arranged on that side of the web opposite from the etch-resistant coating 11'. The second etching chamber includes a pipe 35 for exhausting the fumes emitted by the etching process and includes a series of rollers 36 adapted for guidingly conducting the web through the chamber. The primary distinction between the etching chambers 24 and 33 generally is that the second chamber 33 is longer than the first chamber and provides an etching action of longer duration, and in the second chamber the nozzle groups 34 are arranged only on one side of the web path; the etching is performed only on the non-coated side of the web in the second etching chamber 33 and in the forming of the perforations 8' in the web material. The web is now finished with the etching treatment and is subjected upon leaving the chamber 33, to scrubbing action by passing through opposingly arranged air knives 37, which scrub away the residue etching liquid from the web surfaces. After passing through the air knives, the web is guided into a washing chamber 38 which is of substantially the same construction as the washing chamber 27; the washing chamber 38 is provided with water spray nozzles 39 for spray-washing the web, and includes a water tank 40 through which the web is immerged and preferably includes showering means for providing further cleaning action on the web.

Leaving the washing chamber 39, the web proceeds to the terminal part of the process (not shown) where the etch-resistant coating and pattern film material is stripped from the web structure by suitable cleaning or web treating liquid. At this stage of the process, the web may be repetitiously severed into unit lengths for packaging or further processing. The web-cutting step may optionally be carried out before or after the etch-resistant coating is removed from the web.

In the embodiment described above, the first etching treatment (chamber 22) is conducted on both sides of the web. It will be understood, however, that in certain embodiments of the invention, the first etching action, as shown in FIG. 22, will be applied only on one side of the thin web stock, and only on that side to which the second etch-resistant coating will be applied subsequently in the process. Also, the application of the etch-resistant coating on the web material may be accomplished by other suitable means: In certain embodiments of the invention (not shown) liquid-saturated rollers, brushes or other such means may be utilized for wetting or coating the web stock with the etch-resistant material. Moreover, in certain embodiments of the invention instead of the horizontal web-feeding system, where the axis of the delivery rollers and roll 15 are arranged horizontally, it may be desired to employ a vertical web-feeding system and wherein the axis of the roll 15 is arranged vertically.

SUMMARY OF THE INVENTION

According to the process of the instant invention, firstly, the etch-resistant pattern films **5*a'* and 5*b'* are provided in registry on opposite side surfaces of a metal web 6', and then the exposed surface areas 10*a'* and 10*b'* of the web are subjected to a light-degree of etching action in the first etching chamber 22, so as to form the shallow recesses 12*a'* and 12*b'* in the surface areas 10*a'* and 10*b'* (FIG. 3A). The web is then coated on one side with an etch-resistant coating 11' in the chamber 30; the side of the web where the coating 11' was not applied, is subjected to a second etching treatment in chamber 33 and the recessed areas 12*b'* are enlarged by the erosive action of the liquid until the etching action is stopped by the coating 11' and with subsequent removal of the pattern film and etch-resistant material, the perforations 8''** are formed in the web.

Since the side of the web where no etching is practiced in the second etching treatment is entirely covered with the coating 11', the web is slightly stiffened and reinforced by the coating 11' and in the etching operation—even in processing articles poorly resistant to handling or impact of the etching liquid—there is reduced likelihood of breakage or twisting of the fragile web material by the liquid spray pressure or other forces occurring in the etching operation. The reinforcing or stabilizing effect on the web by the coating or etch-resistant material further facilitates the manufacture of articles of very thin web stock and the forming of perforations of consistently accurate dimensional precision.

I claim:

1. A method of continuously forming perforations in a thin fragile metal web strip comprising the steps of first simultaneously coating opposite side surfaces of the web with a layer of etch-resistant pattern film material to form apertures in register of a desired configuration; simultaneously etching to a slight degree the opposite side surfaces of said web strip thereby forming in the opposite sides aligned slight recesses in the uncoated metal web in which the recesses in one side are of a predetermined area, completely coating said one of the sides of the web strip and the recesses formed in the metal web by applying a second coating of etch-resistant material; etching again from the other side of the web where the recesses were first-formed therein to form enlarged perforations in the web which communicate with the slight recesses of predetermined area covered by the second coating of etch-resistant material; and then cleaning the web by removing the etch-resistant materials.

2. The method according to claim 1 including applying the second etch-resistant coating to the degree of slightly stiffening and reinforcing the web for stabilizing the web whereby consistently accurate perforation dimensions can be attained.

References Cited

UNITED STATES PATENTS

| | | | |
|---|---|---|---|
| 2,750,524 | 6/1956 | Braham | 313—86 |
| 378,423 | 2/1888 | Baynes | 156—11 |
| 2,762,149 | 9/1956 | Mears | 156—11 |
| 3,186,884 | 6/1965 | Haan et al. | 156—13 |
| 3,359,192 | 12/1967 | Heinrich et al. | 204—143 |

JACOB H. STEINBERG, Primary Examiner

U.S. Cl. X.R.

156—17